United States Patent [19]

Mee et al.

[11] 3,723,419
[45] Mar. 27, 1973

[54] PREPARATION OF FORMYLMETHYLENE COMPOUNDS AND CORRESPONDING PHOTOGRAPHIC DYESTUFFS

[75] Inventors: John D. Mee; Donald W. Heseltine, both of Rochester, N.Y.

[73] Assignee: Eastman Kodak Company, Rochester, N.Y.

[22] Filed: May 17, 1967

[21] Appl. No.: 639,030

[52] U.S. Cl. ................... 260/240.6, 96/101, 96/134, 96/135, 96/136, 96/137, 260/240.65, 260/250 R, 260/296 B, 260/298, 260/304, 260/307 D, 260/326.11
[51] Int. Cl. ............................................ C09b 23/06
[58] Field of Search.......... 260/240.6, 240.65, 326.11

[56] References Cited

UNITED STATES PATENTS 3,399,191  8/1968  Brack ............................... 260/240.6
2,126,852  8/1938  Wolff et al ....................... 260/240.6

FOREIGN PATENTS OR APPLICATIONS 466,245  5/1937  Great Britain ..................... 260/240.6
543,993  3/1942  Great Britain ..................... 260/240.6

OTHER PUBLICATIONS

Hunig, Annalen der Chemie, Vol. 574, pages 99 to 106 (1951)
Hamer, Cyanine Dyes and Related Compounds, pages 108 to 109 and 140, Interscience Publishers (NY) 1964
Chemical Abstracts, Vol. 64, cols. 19852 to 19853 (1966) (abstract of French Patent 1,401,594)

*Primary Examiner*—John D. Randolph
*Attorney*—W. H. J. Kline, J. R. Frederick and Ogden H. Webster

[57] ABSTRACT

Formylmethylene dye intermediates are prepared by reacting a heterocyclic quaternary salt with a complex of dialkylformamide and inorganic acid halide followed by hydrolysis. Cyanine dyes are prepared by reacting such formylmethylene dye intermediates with heterocyclic quaternary salt.

3 Claims, No Drawings

PREPARATION OF FORMYLMETHYLENE COMPOUNDS AND CORRESPONDING PHOTOGRAPHIC DYESTUFFS

This invention relates to novel methods for preparing dye intermediates, and to novel methods for preparing cyanine dyes.

It has been proposed to employ as cyanine dye intermediates, formylmethylene compounds derived from heterocyclic quaternary salts. These intermediates have been prepared by hydrolyzing β-anilinovinyl- or β-acetanilidovinyl-derivatives of heterocyclic quaternary salts. This procedure results in the formation of substantial amounts of symmetrical cyanine dye. The amounts of symmetrical cyanine dye formed using this method is especially large when the heterocyclic nucleus of the starting heterocyclic quaternary salt is a "desensitizing nucleus" (defined below). The symmetrical dye formed is very difficult to separate from the desired formylmethylene substituted heterocyclic compound. Also, large quantities of unwanted decomposition products are obtained using this prior art method. We have found a method for preparing formylmethylene derivatives from heterocyclic quaternary salts which avoids the disadvantages of this prior art.

The present invention employs as starting material a heterocyclic quaternary salt, rather than a heterocyclic methylene base. This offers the advantage of a simpler method of preparation than a process which utilizes a methylene base as starting material. Heterocyclic compounds used in dye synthesis are normally prepared in the form of this quaternary salt. In order to employ a methylene base as starting material, the heterocyclic quaternary salt is prepared, treated with a base, and filtered or extracted to obtain the heterocyclic methylene base. These steps are eliminated by the present invention.

One object of this invention is to provide a novel process for preparing dye intermediates.

Another object of this invention is to provide a novel process for preparing formylmethylene derivatives from heterocyclic quaternary salts which avoids formation of symmetrical cyanine dye.

A further object of this invention is to provide a novel process for preparing cyanine dyes.

Another object of this invention is to provide a novel process for preparing unsymmetrical cyanine dyes.

Still another object of this invention is to provide a novel process for preparing cyanine dyes containing desensitizing nuclei.

Other objects of this invention will be apparent from the disclosure herein and the appended claims.

In accordance with one embodiment of this invention, a process is provided for preparing a formylmethylene substituted dye intermediate having the formula:

I.

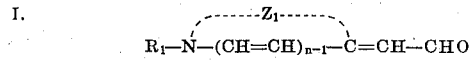
$$R_1-N-(CH=CH)_{n-1}-C=CH-CHO$$

which comprises reacting (a) a heterocyclic quaternary salt having the formula:

II.

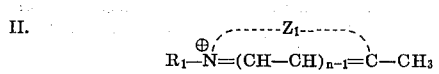
$$R_1-\overset{\oplus}{N}=(CH-CH)_{n-1}=C-CH_3 \quad X^-$$

with (b) a complex formed by the reaction of an inorganic acid halide with a dialkylformamide to obtain a first intermediate having the formula:

III.

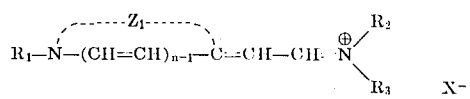

and, hydrolyzing the first intermediate to obtain the formylmethylene substituted dye intermediate.

In above formulas I, II and III, n represents a positive integer of from 1 to 2; $R_1$ represents an alkyl group, (preferably a lower alkyl containing from one to four carbon atoms), e.g., methyl, ethyl, propyl, isopropyl, butyl, hexyl, cyclohexyl, decyl, dodecyl, etc., an alkoxyalkyl group, e.g., β-methoxyethyl, ω-butoxybutyl, etc., a carboxyalkyl group, e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfato-butyl, etc., an acyloxyalkyl group, e.g., β-acetoxyethyl, γ-acetoxypropyl, ω-butyryloxybutyl, etc.; an alkoxycarbonylalkyl group, e.g., β-methoxycarbonylethyl, ω-ethoxycarbonylbutyl, benzyl, phenethyl, etc., and the like, or an alkenyl group, e.g., allyl, 1-propenyl, 2-butenyl, etc., or an aryl group, e.g., phenyl, tolyl, xylyl, methoxyphenyl, chlorophenyl, naphthyl, etc.; X represents an acid anion, (which may be combined with $R_1$) such as chloride, bromide, iodide, thiocyanate, sulfamate, perchlorate, p-toluenesulfonate, methyl sulfate, ethyl sulfate, etc.; $R_2$ and $R_3$ each represents an alkyl substituent, which can contain up to eight or more carbon atoms, preferably a lower alkyl group of from one to four carbon atoms, such as methyl, ethyl, propyl, or butyl; and, $Z_1$ represents the non-metallic atoms required to complete a heterocyclic nucleus containing from five to six atoms in the heterocyclic ring, such as a thiazole nucleus (including a benzothiazole nucleus or a naphthothiazole nucleus), an oxazole nucleus (including a benzoxazole nucleus or a naphthoxazole nucleus), a selenazole nucleus (including a benzoselenazole nucleus or a naphthoselenazole nucleus), a thiazoline nucleus, a 2-quinoline nucleus, a 4-quinoline nucleus, a 3,3-dialkylindolenine nucleus, a 2-pyridine nucleus, or a 4-pyridine nucleus, reference being made to Kendall and Stewart U.S. Pat. No. 3,128,179, issued April 7, 1964, column 3, line 27 through column 4, line 13, for specific useful examples of the nuclei referred to above, and preferably, $Z_1$ can represent the non-metallic atoms required to complete a desensitizing heterocyclic nucleus (defined below) containing from five to six atoms in the heterocyclic ring, such as a nitrobenzothiazole nucleus, e.g., 5-nitrobenzothiazole, 6-nitrobenzothiazole, 5-chloro-6-nitrobenzothiazole, etc.; a nitrobenzoxazole nucleus, e.g., 5-nitrobenzoxazole, 6-nitrobenzoxazole, 5-chloro-6-nitrobenzoxazole, etc.; a nitrobenzoselenazole nucleus, e.g., 5-nitrobenzoselenazole, 6-nitrobenzoselenazole, 5-chloro-6-nitrobenzoselenazole, etc.; an imidazo[4,5-b]quinoxaline nucleus, (as described in Brooker and Van Lare, U.S. Pat. application Serial No. 609,971, filed Jan. 17, 1967) e.g., imidazo[4,5-b]quinoxaline, 1,3-dialkylimidazo[4,5-b]quinoxaline such as 1,3-diethylimidazo[4,5-b]-quinoxaline, 6-chloro-1,3- diethylimidazo[4,5-b]quinoxaline, etc., 1,3-dialkenylimidazo[4,5-b]quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 1,3-diphenylimidazo[4,5-b]quinoxaline, 6-chloro-1,3-diphenylimidazo[4,5-b]quinoxaline, etc.; a 3,3-dialkyl-3H-pyrrolo[2,3-b]pyridine nucleus, e.g., 3,3-dimethyl-3H-pyrrolo[2,3-b] pyridine, 3,3-diethyl-3H-pyrrolo[2,3-b]pyridine, etc.; an indolenine nucleus such as a 3,3-dialkyl-3H-nitroindole, e.g., 3,3-dimethyl-5-nitro-3H-indole, 3,3-diethyl-5-nitro-3H-indole, 3,3-dimethyl-6-nitro-3H-indole, etc.

As used herein and in the appended claims, "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 grams dye per mole of silver, cause by electron trapping at least about an 80 percent loss in the blue speed of the emulsion when sensitometrically exposed and developed three minutes in Kodak developer D-19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95 percent loss of speed to blue radiation). Heterocyclic nuclei can be weakly basic, or desensitizing, as a result of the configuration of the atoms forming the ring (e.g., the imidazo[4,5-b]quinoxaline nucleus) or because of the substitution in the nucleus of groups which have strong electron-withdrawing properties, such as nitro(e.g., a nitrobenzothiazole nucleus). This invention is applicable to both types.

The process of the invention for preparing formylmethylene dye intermediates described above employs a complex formed by the reaction of an inorganic acid halide and a dialkylformamide. Such complexes are known in the art, and are referred to as the "Vilsmeier complex" or the "Vilsmeier reagent." These complexes have been described in the literature. See, for example, Ber. d. Deutschen Chem. Ges., 60B, 121 (1927). The complex can be formed by the reaction of a dialkylformamide with an inorganic acid halide, (or an acid condensing agent containing a halogen, preferably chlorine). Typical specific useful inorganic acid halides are phosphoryl chloride, thionyl chloride, and sulfuryl chloride. Each alkyl group of the dialkylformamide used in forming complexes employed in this invention can contain up to eight or more carbon atoms. Preferably, each alkyl group contains from one to four carbon atoms, e.g., methyl, ethyl, propyl or butyl. The alkyl groups can be different. Dimethylformamide is especially useful. The complex is advantageously formed by combining a relatively large excess of formamide, i.e., greater than about 1 mol. formamide per mol. of inorganic acid halide.

The complex described above is reacted in accordance with the invention with a heterocyclic quaternary salt having Formula II above. This reaction is advantageously conducted in a suitable solvent, such as dimethylformamide. Heating is preferred to accelerate the reaction. At temperatures of about 100°C., reaction is usually about complete within 1 hour. There is thus formed a first intermediate having Formula III above. This intermediate can then be hydrolyzed, without separation, with any suitable hydrolyzing agent to obtain the formylmethylene dye intermediate. Addition of aqueous sodium hydroxide, or other suitable base in an amount to make the reaction mixture basic, will hydrolyze the first intermediate. Hydrolysis usually is complete in one-half hour or less by simply permitting the mixture to stand (after addition of base) at room temperature.

In accordance with another embodiment of this invention, a process is provided for preparing cyanine dyes having the formula:

IV.
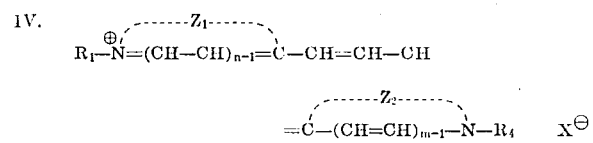

which comprises reacting a compound having Formula II above and the complex formed by the reaction of an inorganic acid halide and a dialkylformamide to obtain a first intermediate having Formula III above; hydrolyzing the first intermediate to obtain a formylmethylene dye intermediate having Formula I above; and, reacting the formylmethylene derivative with a heterocyclic quaternary salt having the formula:

V.
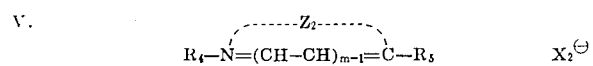

In Formulas IV and V, $R_1$ and $Z_1$ have the same meanings given above; $m$, $R_4$ and $Z_2$ are independently selected from the same values, respectively, given for $n$, $R_1$, and $Z_1$ and, $R_5$ represents an alkyl group (including a substituted alkyl group) preferably containing from one to eight carbon atoms, such as methyl, ethyl, propyl or butyl. In these formulas $X_2$ represents an acid anion.

The preparation of cyanine dyes in accordance with this invention employs the same method for preparing formylmethylene dye intermediates as described above. The formylmethylene derivatives thus prepared are then reacted with a heterocyclic quaternary salt having Formula V above. This reaction is advantageously conducted in a suitable solvent. When $Z_1$ and $Z_2$, or both, in above Formula IV, represent the atoms required to complete a desensitizing nucleus, the solvent in which the reaction is conducted preferably is a solvent medium which is substantially free from basic condensing agents (such as tertiary amines, e.g., pyridine etc.). We have found that this procedure avoids formation of large amounts of decomposition products, and provides substantial increases in dye yields. Dyes are obtained in a high state of purity. This invention is also particularly suitable for preparing unsymmetrical dyes, whether the nuclei thereof are sensitizing, desensitizing or mixed.

The method of this invention for preparing formylmethylene dye intermediates is especially useful since the starting material is a heterocyclic quaternary salt, and since the method avoids the formation of symmetrical cyanine dye. It should be noted when prior art β-anilino derivatives of heterocyclic quaternary salts are used to prepare formylmethylene dye intermediates, especially large quantities of symmetrical dye are formed if the heterocyclic quaternary salt is weakly basic.

Dyes formed by the processes of this invention are highly useful in photographic silver halide emulsions. Some are useful in sensitizing negative silver halide emulsions, the others are useful as spectral sensitizers and electron acceptors in direct positive halide emulsions.

This invention will be further illustrated by the following examples. Example 1 through 3 demonstrate the preparation of formylmethylene dye derivatives in accordance with this invention.

EXAMPLE 1

3-Ethyl-2-formylmethylene-6-nitrobenzothiazoline

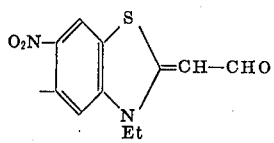

A solution of 3-ethyl-2-methyl-6-nitrobenzothiazolium p-toluenesulfonate (7.9 g., 1 mol.) in warm dimethylformamide (25 ml.) is added to a mixture of phosphoryl chloride (2 ml., 1 mol. + 10%) and dimethylformamide (6 ml.). The mixture is heated on a steam-bath for three-fourths hour, then poured into water (300 ml). The mixture contains a first intermediate having the formula:

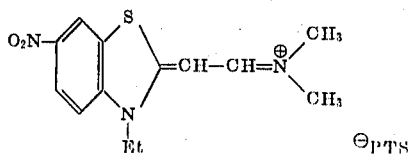

The mixture is made basic by addition of 5N NaOH (28 ml.) and allowed to stand for one-half hour at room temperature. The precipitated solid is collected and well washed with water. The crude material is recrystallized from dimethylformamide and washed with methanol. The yield is 3.56 g. (71%), m.p. indistinct. No symmetrical dye is apparent in the product.

When the procedure of Example 1 is repeated, but substituting for the 3-ethyl-2-methyl-6-nitrobenzothiazolium p-toluenesulfonate an equivalent amount of 3-ethyl-2-methyl-5-nitrobenzoselenazolium p-toluenesulfonate, or 1 mol. of 3-ethyl-2-methyl-6-nitrobenzoxazolium p-toluenesulfonate, there is obtained, respectively, 3-ethyl-2-formylmethylene-5-nitrobenzoselenazoline, and 3-ethyl-2-formylmethyene-6-nitrobenzoxazoline, in similar yield. No symmetrical dye is apparent in the product.

EXAMPLE 2

1,3-Diallyl-2-formylmethylene-1,2-dihydroimidazo[4,5-b]quinoxaline

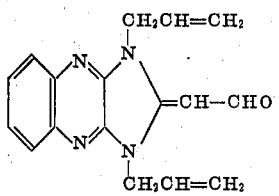

1,3-Diallyl-2-methylimidazo[4,5-b]quinoxalinium p-toluenesulfonate (prepared by the method described in Brooker and Van Lare U.S. Pat. application Ser. No. 609,791, filed Jan. 17, 1967) (4.36 g., 1 mol.) is added to to a mixture of phosphoryl chloride (1.0 ml., 1 mol. + 10%) and dimethylformamide (10 ml.), and the whole heated on a steam-bath for 1½ hours. The mixture, which contains a first intermediate having the formula:

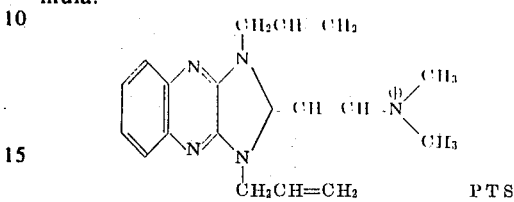

is poured into water (150 ml.). The mixture is made basic by the addition of 5N NaOH (14 ml.). After one-half hour, the precipitated solid is collected and well washed with water. The crude material is purified by recrystallization from ethanol. The yield is 1.85 g. (63%), m.p. 172°. No symmetrical dye is apparent in the product.

When Example 2 is repeated but instead of the 1,3-diallyl-2methylimidazo[4,5-b]quinoxalinium p-toluenesulfonate, there is substituted an equivalent amount of 6-chloro-2methyl-1,3-diphenylimidazo[4,5-b]quinoxalinium p-toluenesulfonate, (prepared as described in the Brooker et al. application above) there is obtained in similar yield, the compound 6-chloro-2formylmethylene-1,3-diphenyl-1,2-dihydroimidazo[4,5-b]quinoxaline.

EXAMPLE 3

2-Formylmethylene-1,3,3-trimethyl-5-nitroindoline

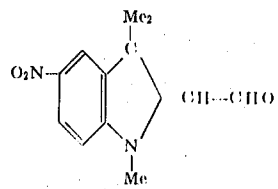

1,2,3,3-Tetramethyl-5-nitro-3H-p-toluenesulfonate (11.7 g., 1 mol.) is added to a mixture of phosphoryl chloride (3.0 ml., 1 mol. + 10%) and dimethylformamide (30 ml.). The mixture is heated on a steam-bath for one-half hour, then poured into water (300 ml.). The solution contains a first intermediate having the formula:

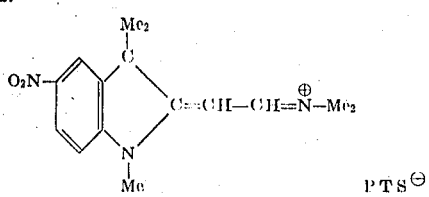

The mixture is made basic by the addition of 5N NaOH (42 ml.). After one-fourth hour, the precipitated solid is collected and well washed with water. After recrystallization from ethanol, the yield of purified material is 5.0 g. (68%), m.p. 231°–2°. No symmetrical dye is apparent in the product.

Examples 4 through 9 illustrate the preparation of cyanine dyes in accordance with the invention, employing formylmethylene dye intermediates prepared in accordance with this invention.

EXAMPLE 4

1,3-Diallyl-3′-ethyl-6′-nitroimidazo[4,5-b]quinoxalinothiacarbocyanine p-toluenesulfonate

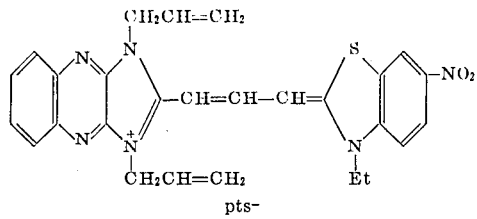

1,3-Dially-2-formylmethylene-1,2-dihydroimidazo[4,5-b]quinoxaline (0.73 g., 1 mol.) prepared in Example 2, and 3-ethyl-2-methyl-6-nitrobenzothiazolium p-toluenesulfonate in acetic anhydride (10 ml.) are heated at reflux for 1 minute. Excess ether is added to the cooled reaction mixture, and the precipitated solid is collected and washed with ether. After two recrystallizations from methanol, the yield of purified dye is 0.97 g. (58%), m.p. 255°–8° (dec.). When this procedure is repeated, but pyridine instead of acetic anhydride is employed as the reaction medium, the yield of dye drops drastically and substantial quantities of unwanted decomposition products are formed.

The procedure of Example 4 is repeated but the 1,3-diallyl-2-formylmethylene-1,2-dihydroimidazo[4,5-b]quinoxaline is replaced with an equivalent amount of 6-chloro-2-formylmethylene-1,3-diphenyl-1,2-dihydroimidazo[4,5-b]quinoxaline, the dye 6-chloro-3′-ethyl-6′-nitro-1,3-diphenylimidazo[4,5-b]quinoxalinothiacarbocyanine p-toluenesulfonate is obtained in similar yield.

EXAMPLE 5

1,3-Diallyl-1′,3′,3′-trimethylimidazo[4,5-b]quinoxalino-3H-pyrrolo[2,3-b]pyridocarbocyanine iodide

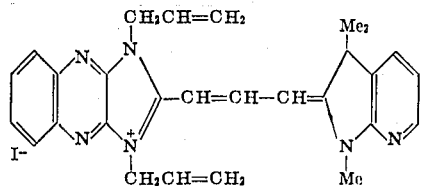

1,3-Diallyl-2-formylmethylene-1,2-dihydroimidazo[4,5-b]quinoxaline (0.73 g., 1 mol.) and 1,2,3,3-tetramethylpyrrolo[2,3-b]pyridinium p-toluenesulfonate (0.87 g., 1 mol.) in acetic anhydride (10 ml.) are heated at reflux for 1 minute. The cooled mixture is diluted with excess ether, when the product precipitates as an oil. The ether is decanted and the oil crystallized from a mixture of methanol (175 ml.) and 48 percent aqueous HI (1.0 ml.). After a further recrystallization from methanol, the yield of purified dye is 0.37 g. (26%), m.p. 210°–2° (dec.).

When the procedure of Example 5 is repeated but an equivalent amount of 6-chloro-2-formylmethylene-1,3-diphenyl-1,2-dihydroimidazo[4,5-b]quinoxaline (prepared as above) is substituted for the 1,3-diallyl-2-formylmethylene-1,2-dihydroimidazo[4,5-b]quinoxaline, there is obtained the dye 6-chloro1′,3′,3′-trimethyl-1,3-diphenylimidazo[4,5-b]quinoxalino-3H-pyrrolo[2,3-b]pyridocarbocyanine iodide, in similar yield.

EXAMPLE 6

3′-Ethyl-1,3,3-trimethyl-6′-nitro-3H-pyrrolo[2,3-b]pyridothiacarbocyanine bromide

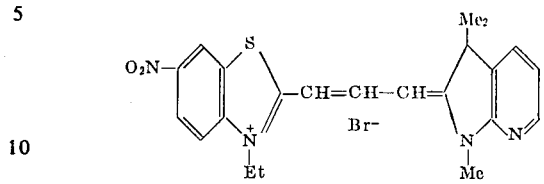

3-Ethyl-2-formylmethylene-6-nitrobenzothiazoline (1.25 g., 1 mol.) and 1,2,3,3-tetramethylpyrrolo[2,3-b]pyridinium p-toluenesulfonate (1.73 g., 1 mol) in acetic anhydride (10 ml.) are heated at reflux for 1 minute. Excess ether is added to the cooled reaction mixture, and the product separates as a sticky mass. The ether is decanted and the residue is crystallized from a mixture of methanol (175 ml.) and 48 percent aqueous HBr (1.0 ml.). After a further recrystallization from methanol, the yield of purified dye is 0.59 g. (24%), m.p. 243°–4° (dec.).

EXAMPLE 7

3′-Ethyl-1,3,3-trimethyl-5,6′-dinitroindothiacarbocyanine p-toluenesulfonate

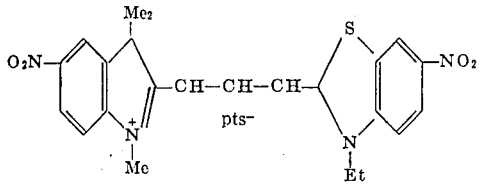

2-Formylmethylene-1,3,3-trimethyl-5-nitroindoline (0.62 g., 1 mol.) and 3-ethyl-2-methyl-6-nitrobenzothiazolium p-toluenesulfonate (0.99 g., 1 mol.) in acetic anhydride (10 ml.) are heated at reflux for 1 minute. The cooled mixture is diluted with excess ether. The product separates as a semi-solid, from which the ether is decanted. After two recrystallizations from methanol, the yield of purified dye is 0.62 g. (40%), m.p. 247° (dec.).

EXAMPLE 8

1,3-Diallyl-1′,3′, 3′-trimethyl-5′-nitroimidazo[4,5-b]quinoxalinoindocarbocyanine bromide

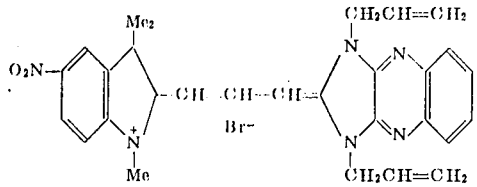

2-Formylmethylene-1,3,3-trimethyl-5-nitroindoline (0.62 g., 1 mol.) and 1,3-diallyl-2-methylimidazo[4,5-b]quinoxalinium p-toluenesulfonate (1.09 g., 1 mol.) in acetic anhydride (10 ml.) are heated at reflux for 1 minute. The cooled reaction mixture is diluted with excess ether and the product separates as a semi-solid. The ether is decanted and the residue crystallized from methanol containing aqueous HBr solution. After a further recrystallization from methanol, the yield of purified dye is 0.25 g. (18%), m.p. 255°–6°(dec.).

EXAMPLE 9

1,1',3,3,3',3'-Hexamethyl-5-nitroindo-3H-pyrrolo[2,3-b]pyridocarbocyanine iodide

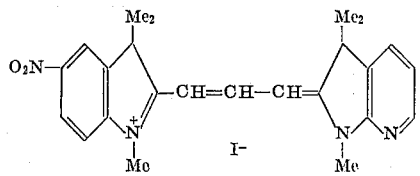

2-Formylmethylene-1,3,3-trimethyl-5-nitroindoline (1.23 g., 1 mol.) and 1,2,3,3-tetramethylpyrrolo[2,3-b]pyridinium p-toluenesulfonate (1.73 g., 1 mol.) in acetic anhydride (10 ml.) are heated at reflux for 1 minute. On dilution of the cooled reaction mixture with ether, the product separates as a semi-solid, from which the ether is decanted. The residue is crystallized from methanol containing aqueous HI solution. After a further recrystallization from methanol, the yield of purified dye is 1.01 g. (38%), m.p. 280° (dec.).

The invention has been described in detail with particular reference to preferred embodiments thereof, but, it will be understood that variations and modifications can be effected within the spirit and scope of the invention described hereinabove and in the appended claims.

We claim:

1. The process for preparing 1,3-diallyl-3'-ethyl-6'-nitroimidazo[4,5-b]quinoxalinothiacarbocyanine salt which comprises:
   a. preparing 1,3-diallyl-2-formylmethylene-1,2-dihydroimidazo[4,5-b]quinoline intermediate by heating, in dimethylformamide, at about 100°C, a mixture of (1) about 1 mol. 1,3-diallyl-2-methylimidazo[4,5-b]quinoxalinium salt and (2) a complex formed by the reaction of about 1.1 mol. phosphoryl chloride and excess dimethylformamide to obtain a quaternary salt having the formula:

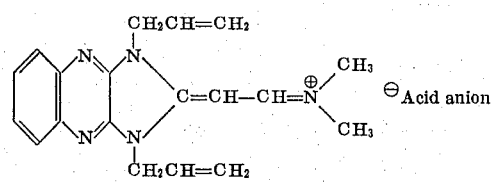

b. hydrolyzing said quaternary salt; and,
   c. reacting the formylmethylene intermediate obtained by (b), in acetic anhydride and at reflux temperature, with 3-ethyl-2-methyl-6-nitrobenzothiazolium salt.

2. The process for preparing 1,3-diallyl-1',3'3'-trimethylimidazo[4,5-b]quinoxalino-3H-pyrrolo[2,3-b]pyridocarbocyanine salt which comprises:
   a. preparing 1,3-diallyl-2-formylmethylene-1,2-dihydroimidazo[4,5-b]quinoxaline intermediate by heating, in dimethylformamide, at about 100°C, a mixture of (1) about 1 mol. 1,3-diallyl-2-methylimidazo[4,5-b]quinoxalinium salt and (2) a complex formed by the reaction of about 1.1 mol. phosphoryl chloride and excess dimethylformamide to obtain a quaternary salt having the formula:

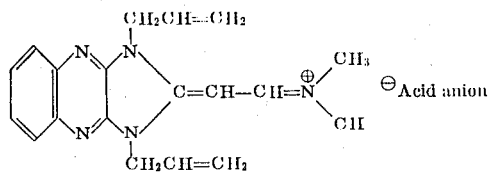

b. hydrolyzing said quaternary salt; and,
   c. reacting the formylmethylene intermediate obtained in (b), in acetic anhydride and at reflux temperature, with 1,2,3,3-tetramethylpyrrolo[2,3-b]pyridinium salt.

3. The process for preparing 3'-ethyl-1,3,3-trimethyl-6'-nitro-3H-pyrrolo[2,3-b]pyridothiacarbocyanine salt which comprises
   a. preparing 3-ethyl-2-formylmethylene-6-nitrobenzothiazoline intermediate by heating in dimethylformamide at about 100°C, a mixture of (1) about 1 mol. 3-ethyl-2-methyl-6-nitrobenzothiazolium salt and (2) a complex formed by the reaction of about 1.1 mol. phosphoryl chloride and excess dimethylformamide to obtain a quaternary salt having the formula:

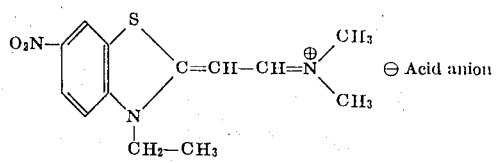

b. hydrolyzing said quaternary salt; and,
   c. reacting the formylmethylene intermediate obtained in (b), in acetic anhydride and at reflux temperature, with 1,2,3,3-tetramethylpyrrolo[2,3-b]pyridinium salt.

* * * * *